United States Patent [19]

Schmitt

[11] Patent Number: 4,860,637

[45] Date of Patent: Aug. 29, 1989

[54] BRAKE VALVE WITH BRAKE BOOSTER

[75] Inventor: Edgar Schmitt, Vaihingen/Enz, Fed. Rep. of Germany

[73] Assignee: Robert Bosch GmbH, Stuttgart, Fed. Rep. of Germany

[21] Appl. No.: 182,008

[22] Filed: Apr. 15, 1988

[30] Foreign Application Priority Data

May 9, 1987 [DE] Fed. Rep. of Germany ....... 3715568

[51] Int. Cl.$^4$ .............................................. F15B 9/10
[52] U.S. Cl. ...................................... 91/376 R; 251/86
[58] Field of Search ............ 91/358, 368, 374, 376 R, 91/422; 60/547.1, 593; 251/84, 86

[56] References Cited

U.S. PATENT DOCUMENTS

| | | | |
|---|---|---|---|
| 2,698,205 | 12/1954 | Gagen | 303/54 |
| 2,840,336 | 6/1958 | Suthann | 251/86 X |
| 3,182,443 | 5/1965 | Hermanns | 91/368 |
| 3,691,903 | 9/1972 | Shellhause | 91/376 R X |
| 3,707,112 | 12/1972 | Ewald | 91/376 R |
| 3,834,277 | 9/1974 | Yabuta et al. | 91/376 R |
| 3,951,043 | 4/1976 | Keady | 91/376 R X |
| 4,014,171 | 3/1977 | Kobashi | 91/376 R X |
| 4,022,111 | 5/1977 | Taft | 91/376 R X |
| 4,337,686 | 7/1982 | Ohta | 91/374 X |
| 4,514,981 | 5/1985 | Brown et al. | 251/86 X |
| 4,665,701 | 5/1987 | Bach | 60/547.1 |
| 4,685,297 | 8/1987 | Brown, Jr. | 60/547.1 |

Primary Examiner—Robert E. Garrett
Assistant Examiner—Mark A. Williamson
Attorney, Agent, or Firm—Edwin E. Greigg

[57] ABSTRACT

A brake valve for brake boosters in which a slide is guided in a sheath that is supported in rounded fashion at one end face, such that the slide, along with the sheath, is pivotable and can center itself, with a bezel formed onto its end face, in the valve seat of a valve bushing. The slide and valve bushing form a valve in which the closing behavior is improved considerably by the automatic centering of the slide in the valve seat.

4 Claims, 1 Drawing Sheet

U.S. Patent
Aug. 29, 1989
4,860,637
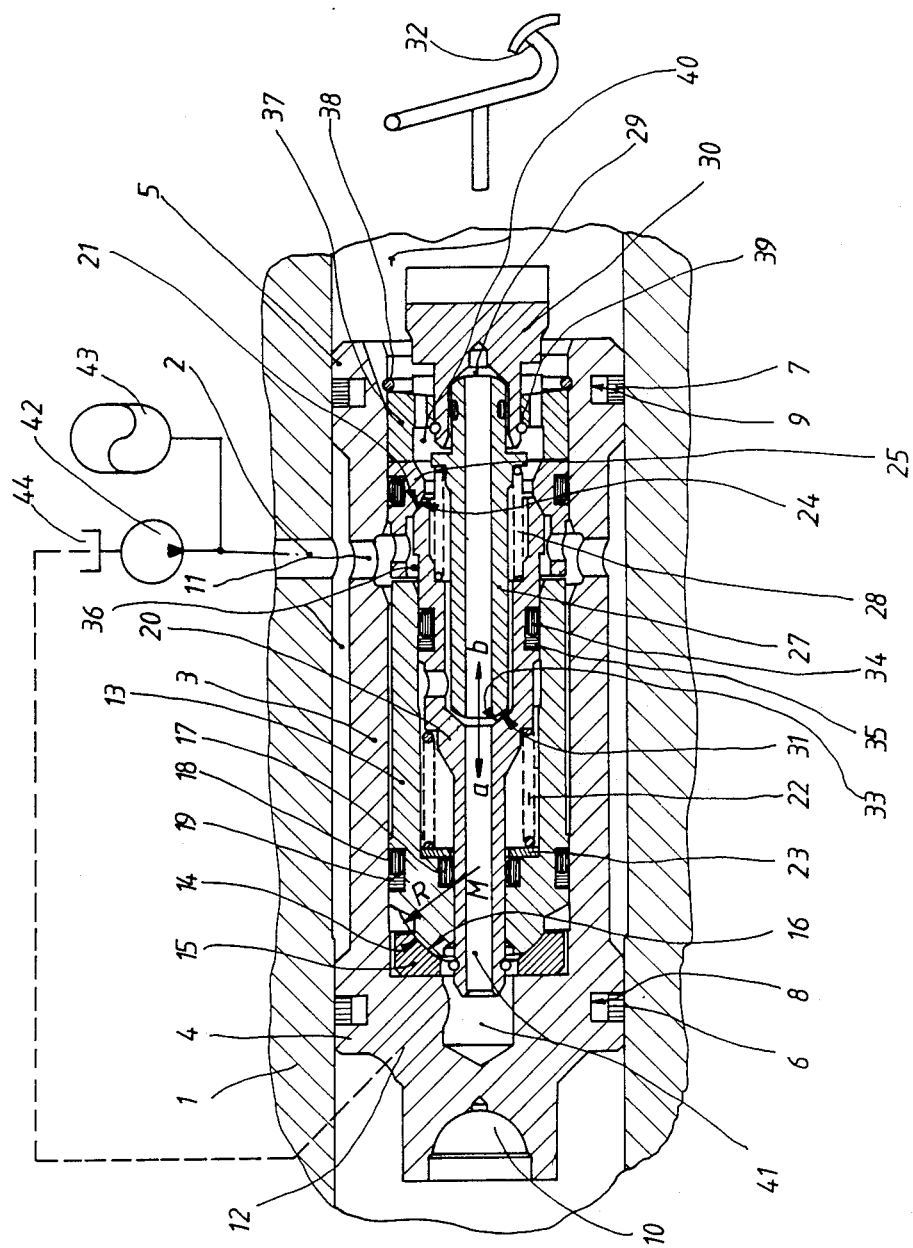

BRAKE VALVE WITH BRAKE BOOSTER

BACKGROUND OF THE INVENTION

The invention relates to a brake valve for brake boosters as defined herein. Brake boosters are incorporated between the brake pedal and the brake system in motor vehicles, to increase the braking action. These brake boosters are intended to amplify the force fed by the pedal. Known brake boosters include a brake valve that is actuated via the brake pedal and thereby causes a pressurized medium to act upon a booster piston, which in turn generates a brake force. A slide used in such brake valves is typically supported at at least two points. Because of manufacturing tolerances, the slide is not centrally located with respect to the valve seat embodied as its counterpart, and as a result must be pressed into the valve seat by a sufficiently great spring force.

OBJECT AND SUMMARY OF THE INVENTION

When a spherically supported, pivotable sheath in which the slide is guided is used, the slide can center itself in the valve seat, assuring reliable closing of the valve. The spring force of the spring required for closing the valve can therefore be reduced as well. It is particularly advantageous if the seals required on the circumference of the sheath are disposed at the level of the pivot point, so as to avoid uneven deformations of the seals caused by the pivotability of the sheath.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing is a schematic view of an embodiment of the invention.

DESCRIPTION OF THE PREFERRED EMBODIMENT

A booster piston 3 is displaceably supported in a housing 1 having a bore 2 for introducing a hydraulic fluid. The booster piston 3 is provided with two collars 4, 5 on its circumference, of which the collar 5 has a slightly larger outside diameter due to a slightly larger bore in the housing. Two annular grooves 8, 9 on the collars 4, 5 serve to receive seals 6, 7. A hemispherical depression 10 is formed into the end face of the booster piston 3 and serves to receive a bolt, not shown, that is connected to the master brake cylinder. Hydraulic fluid is supplied through a bore 11 and removed through a bore 12. A sheath 13, having a rounded bezel 14 formed onto its end face, is located in the booster piston 3. The sheath 13 rests with the rounded bezel 14, which has the radius R, on a bearing disk 15, which is likewise provided with a rounded or tapered bezel 16. The sheath 13 can thereby be pivoted about a pivot point M, which is the center of the spherical surface defined by the bezel 14.

A static seal 19 and two dynamic seals 17 and 18 are present, which preferably, to prevent their being deformed, are disposed at the level of the pivot point M.

A slide 20 is supported in a bore in the sheath 13 and with a valve cone shape 21 formed on its face end is pressed by a spring 22, which is supported on a cover disk 23 and a shoulder on the valve cone, against the valve seat 24 of a valve bushing 25 and with the valve bushing forms an outer valve. The slide 20 is opened with a pressure sleeve 27, which one end is pressed by a spring 28 in spring chamber into a bore 29 in the pedal tappet 30. The pressure sleeve 27 is provided with a bezel 31 on one end, which upon actuation of the brake pedal rests on a bezel 33 in the slide 20. The slide 20 and the pressure sleeve 27 thus form a second valve, which is kept in the opened position by the spring 28 when no force is applied by the pedal. A static seal 34 and a dynamic seal 35 are provided for sealing off a chamber 36, in which an overpressure prevails. A spacer ring 37 and snap rings 38, 39 serve to connect the booster piston 3 with the pedal tappet 30. A pressure chamber 40 is formed on the pedal side of valve 21, 24.

The mode of operation of the brake booster brake valve according to the invention is as follows:

Upon actuation of the brake pedal 32, the pedal tappet 30 displaces the pressure sleeve 27 counter to the force of the spring 28 in the direction a, until the pressure sleeve 27 rests with its bezel end 31 on the bezel 33 of the slide 20 to close the inner valve 31, 33. Upon further motion of the brake pedal, the slide 20 is likewise carried along in the direction a, and the outer valve 21, 24 opens. The pressure generated in the chamber 36 by a pump 42 and a pressure reservoir 43 is thereby built up in the chamber 40 as well and acts upon the booster piston 3 and moves the booster piston in the direction a also. A bolt, not shown, which is supported in the hemispherical depression 10 on the end face of the booster piston 3, transmits the force generated to the master brake cylinder, not shown. The motion of the booster piston 3 lasts until the valve seat 24 of the valve bushing 25 that is carried along with the tappet by the snap ring 38 via the spacer ring 37 again rests on the slide, so that the outer valve 21, 24 is closed. If the brake pedal 32 is depressed farther the process is repeated. When the pedal is released, the pedal tappet 30 and the pressure sleeve 27, pressed into the bore 29 by the spring 28, move in the direction b and open the inner valve 31, 33, while the outer valve 21, 24 remains closed. The pressure prevailing in the chamber 40 is reduced via the spring chamber by the opening of the inner valve 31, 33 toward the pressureless chamber 41, allowing the hydraulic fluid to return via the bore 41 in slide 20, chamber 41 and bore 12 to a reservoir 44. The overpressure in the chamber 36 has the effect that a force that moves the entire booster piston in the direction b engages the slightly larger outside diameter of the collar 5 formed by the slightly larger diameter bore. The slide 20 moves closer to the pressure sleeve 27 until it rests on the pressure sleeve at its end face. In this position, the inner valve is closed, and the return flow of the hydraulic fluid to the reservoir 44 is interrupted. Consequently, the booster piston 3 comes to a standstill as well.

Because the sheath 13 is supported in rounded fashion, the slide 20 which is guided in the sheath 13 is lent a corresponding slight pivotability about the pivot point M, which facilitates the closure of the valve seat 24 at the valve cone 21. As a result, the valve seat 24 can be introduced accurately into the valve cone 21 with relatively slight spring forces, even in the presence of bearing tolerances or valve seat tolerances.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A brake valve for brake boosters operable in a housing, said brake valve being disposed in a blind bore in a booster piston (3), an axially displaceable slide (20) supported in a sheath (13) operable in said booster piston, one end of said slide forming a valve cone shape (21) operable relative to a valve seat (24), said sheath (13) is spherically supported on an end face of said brake valve remote from said valve seat (24) and is slightly pivotable about a pivot point (M), a spring (22) positioned relative to said slide that in a position of repose is pressed by a spring force against said valve seat (24) of the brake valve, said slide (20) being supported pivotably in said booster piston (3) remote from said valve cone shape (21).

2. A brake valve as defined by claim 1, which includes a bearing disk (15), said sheath (13) includes an end with a rounded bezel (14) which is inserted into said bearing disk (15), said bearing disk embodied in a correspondingly rounded, tapered fashion which is supported in said booster piston (3).

3. A brake valve as defined by claim 2, which includes seals (18, 19) on a circumference of said sheath (13) disposed opposite said pivot point (M).

4. A brake valve as defined by claim 1, which includes seals (18, 19) on a circumference of said sheath (13) disposed opposite said pivot point (M).

* * * * *